United States Patent
Chainer et al.

(10) Patent No.: US 7,019,926 B2
(45) Date of Patent: Mar. 28, 2006

(54) SELF-SERVO-WRITING MULTI-SLOT TIMING PATTERN

(75) Inventors: Timothy J. Chainer, Putnam Valley, NY (US); Mark D. Schultz, Ossining, NY (US); Bucknell C. Webb, Ossining, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 428 days.

(21) Appl. No.: 10/184,343

(22) Filed: Jun. 27, 2002

(65) Prior Publication Data

US 2004/0012874 A1    Jan. 22, 2004

(51) Int. Cl.
    *G11B 5/09*      (2006.01)

(52) U.S. Cl. .......................... 360/51; 360/75
(58) Field of Classification Search ............ 360/51, 360/75, 31, 53, 7, 48
See application file for complete search history.

(56) References Cited

U.S. PATENT DOCUMENTS

| | | | |
|---|---|---|---|
| 5,615,058 A * | 3/1997 | Chainer et al. ............. 360/51 |
| 5,901,003 A | 5/1999 | Chainer et al. | |
| 5,907,447 A * | 5/1999 | Yarmchuk et al. ........... 360/75 |
| 6,075,668 A | 6/2000 | Chainer et al. | |
| 6,078,450 A | 6/2000 | Chainer et al. | |
| 6,307,697 B1 | 10/2001 | Chainer et al. | |
| 6,324,027 B1 | 11/2001 | Chainer et al. | |
| 6,429,989 B1 | 8/2002 | Schultz et al. | |
| 6,633,451 B1 | 10/2003 | Chainer et al. | |

\* cited by examiner

*Primary Examiner*—Alan T. Faber
(74) *Attorney, Agent, or Firm*—Jon A. Gibbons; Fleit, Kain, Gibbons, Gutman, Bongini & Bianco P.L.

(57) ABSTRACT

A system and method for self-servo-writing of multi-slot timing patterns is described. Individual timing marks are replaced with groups of timing mark slots. At each timing mark location, a time measurement is made by detecting a timing mark in one of the slots. Also, extensions to the existing timing marks are written in other slots. The combination of timing measurements at every timing mark and extensions to those timing marks written at every opportunity improves the overall precision of the timing propagation. The improved accuracy of timing mark placement produces a commensurate improvement in the placement of the concomitantly written servo-data. In addition, the alignment accuracy of the written pattern is less sensitive to variations in rotation speed and variations in the shape of written transitions. Moreover, only a single disk revolution is required at each servo radius to write servo data and propagate the timing marks.

23 Claims, 8 Drawing Sheets

|  | READ SLOT (RS) | | |
|---|---|---|---|
|  | 1 | 2 | 3 |
| WS1 | 2 | 3 | 1 |
| WS2 | 3 | 1 | 2 |
| NEXT RS | 2 | 3 | 1 |
| W1[i] | D[i]+I[i-1,i]+A-W0+d | D[i]+I[i-1,i]+A-W0-d | D[i]+I[i-1,i]+A-W0-2d |
| W2[i] | D[i]+I[i-1,i]+A-W0+2d | D[i]+I[i-1,i]+A-W0+d | D[i]+I[i-1,i]+A-W0-d |

*FIG. 5*

|  | READ SLOT (RS) | | |
|---|---|---|---|
|  | 1 | 2 | 3 |
| WS1 | 2 | 3 | 1 |
| WS2 | 3 | 1 | 2 |
| NEXT RS | 2 | 3 | 1 |
| W1[i] | D[i]+d-CC[i] | D[i]+d-CC[i] | D[i]+I[i-1,i]+A-2d-W0 |
| W2[i] | D[i]+2d-CC[i] | D[i]+I[i-1,i]+A-d-CC[i-1]-W0 | D[i]+I[i-1,i]+A-d-CC[i-1]-W0 |
| C[S,i] | 0 | N1=N then IM[i,i-1]-W2[i]-d ELSE 0 | IM[i,i-1]-W1[i]-2d |
| T1 Trigger | MARK DETECT | T0 | T0 |
| T2 Trigger | MARK DETECT | MARK DETECT | T0 |

*FIG. 6*

SELF-SERVO-WRITING MULTI-SLOT TIMING PATTERN

BACKGROUND OF THE INVENTION

1. Field of the Invention

The present invention relates to the field of timing pattern generation for self-servo-writing magnetic drives.

2. Description of Related Art

High track densities in rotating media mass storage devices are becoming possible with newer drive technologies. These new technologies include voice-coil and other types of servo positioners as well as the ability to read and write narrower tracks by using, for example, magneto-resistive (MR) head technology. Higher track densities increase the accuracy requirements of servowriting methods for embedded servo systems needed to position the head.

Conventional disk drive manufacturing techniques, for example, include writing servo-tracks on the media of a head disk assembly (HDA) with a specialized servo-writer instrument. Laser positioning feedback is used in such instruments to read the actual physical position of a recording head used to write the servo-tracks. Unfortunately, it is becoming more and more difficult for such servo-writers to invade the internal environment of a HDA for servo-writing because the HDAs themselves depend on their covers and castings being in place for proper operation. Also, some HDAs are very small, less than 2 inches square At such levels of microminiaturization, traditional servo-writing methods are inadequate.

Conventional servo-patterns typically comprise short bursts of a constant frequency signal, very precisely located offset on either side from a data track's center line. The bursts are written in a sector header area, and can be used to find the center line of a track. Staying on center is required during both reading and writing. Since there can be 100 or more sectors per track, that same number of servo data areas must be dispersed around a data track.

Further, the servo-data is generally dispersed around the data track by writing short bursts in each of the hundred or so sector header areas of the data track. Such data bursts can be used by the embedded servo mechanism to find the center line of the data track. This allows the head to follow the track center line around the disk even when the track is out of round (e.g., due to spindle wobble, disk slip, and/or thermal expansion). As the capacity of disk drives increases track density is likewise increased, the servo-data must be more accurately located on the disk.

Servo-data is conventionally written by dedicated, external servo-writing equipment, and typically involves the use of granite blocks to support the disk drive and quiet outside vibration effects. An auxiliary clock head is inserted onto the surface of the recording disk and is used to write a reference timing pattern. An external head/arm positioner with a very accurate lead screw and a laser displacement measurement device for positional feedback is used to precisely determine transducer location. This precise transducer location is the basis for track placement and track-to-track spacing. The servo writer requires a clean room environment, as the disk and heads are exposed to the environment to allow the access of the external head and actuator.

A conventional servo-data pattern on a disk comprises circular data tracks that are broken into sectors. Each sector typically has a sector header area followed by a data area. Each sector header area includes sector header information followed by a servo-data area that provides radial position information. The sector header information includes a servo-identification (SID) field and a gray code field that must be precisely aligned from track to track to prevent destructive interference in the magnetic pattern. Such interference can reduce the amplitude of the signal and cause data errors.

During conventional drive manufacturing, the disk drive is typically mounted in a mastering station that is known as a servo-writer. The servo-writer has sensors that are positioned outside of the disk drive to locate the radial and circumferential position of at least one of the drive's internal heads. Using information from the sensors, the servo-writer causes the head to write a pattern, typically magnetic information, (i.e., servo-data) onto the disk. As explained above, the servo-pattern becomes the master reference used by the disk drive during normal operation to locate the tracks and sectors for data storage. When such a station is used to perform the servo-writing, manufacturing expenses increase because each disk drive must be mounted in the servo-writer. Additionally, the mechanical boundary conditions of the disk are altered because the external sensors must have access to the actuator and the disk spindle motor. Thus, mechanical clamping and disassembly of the drive may also be required.

According to another conventional servo-writing process, a master clock track is first written on the disk by a separate head to serve as a timing reference for the entire servo-track writing operation. After writing the master clock track, servo-data bursts are written over the entire surface of the disk by first moving the arm to the outer crash stop and then radially moving the arm a distance that is less than a data track width using an external radial positioning system for each revolution of the disk.

Such conventional servo-writing procedures require the use of an external timing sensor in order to write the timing patterns that are used to determine the circumferential head position. Because external sensors are needed, the servo-writing must be performed in a clean room environment. Additionally, an external clock source and auxiliary clock heads are required to write the timing information.

To overcome such problems, self-servo-writing timing generation processes have recently been developed. These processes allow accurately aligned servo-data tracks to be written sequentially at each servo data radius without using any mechanical, magnetic, or optical positioning systems to control the circumferential positioning of the servo data. Further, the need for auxiliary clock heads to write a reference timing pattern on the disk is eliminated.

According to one method, first timing marks are written at a first radial position of the storage medium. Time intervals between selected pairs of the first timing marks are measured. The head is moved to a second radial position. Next, additional timing marks are written by recording the time of passage of every other timing mark (say the odd numbered ones) during revolutions of the disk and then writing the intervening time marks (the even numbered ones) at calculated delays thereafter. The time intervals between the newly written (even) marks are estimated to be the difference in times of passage of the adjacent timing (odd) marks plus the difference in the delay before writing the new timing marks. Then the head is moved to a second radial position. Next, additional timing marks are written by recording the time of passage of every other timing marks at the circumferential positions just written (here the even numbered ones) during revolutions of the disk and then writing the intervening time marks (the odd numbered ones) at calculated delays thereafter.

The time intervals between the newly written (odd) marks are estimated to be the difference in times of passage of the adjacent timing (even) marks plus the difference in the delay before writing the new timing marks. In the preferred method, servo data is written on one or more disk surfaces in the intervals between the timing marks. In a preferred method, the steps of measuring, moving, and writing other timing marks are repeated until the servo-pattern is written on an entire surface of the storage medium.

While such self-servo-writing processes are sufficient when the servo-data tracks are to be written using overlapping read and write heads (i.e., where a track can be written and read without changing head position), disk drives with non-overlapping read and write elements are now being produced.

More specifically, as read and write element dimensions have been decreased to increase storage density, the widths over which reading and writing occur have decreased more rapidly than the distance between the read and write elements themselves. As a result, when using a head with such elements on a rotary actuator, the read element of the head can no longer overlap the area written by the write element of the head at all radial positions. When the above self-servo-writing processes are used for drives in which the read and write elements do not overlap, accurate circumferential alignment of the servo-data tracks is not maintained and there is a lack of stability against the growth of random errors in the pattern generation process.

According to another method, first timing marks are written at a first radial position of the storage medium during revolutions of the disk. Then the head is moved to a second radial position. Time intervals between selected pairs of the first timing marks are measured during revolutions of the disk. Next, additional timing marks are written by recording the time of passage of every other timing mark (say the odd numbered ones) during revolutions of the disk and then writing the intervening time marks (the even numbered ones) at calculated delays thereafter. Then the head is moved to a second radial position. Time intervals between selected pairs of the first timing marks are measured during revolutions of the disk. Next, additional timing marks are written by recording the time of passage of every other timing marks at the circumferential positions just written (here the even numbered ones) during revolutions of the disk and then writing the intervening time marks (the odd numbered ones) at calculated delays thereafter. In a preferred method, the steps of moving, measuring, and writing other timing marks are repeated until the servo-pattern is written on an entire surface of the storage medium.

Commonly owned U.S. Pat. application Ser. No. 09/592,740, filed Jun. 13, 2000 and entitled "Method for Self-Servo Writing Timing Propagation" is hereby incorporated by reference in its entirety. This U.S. Patent Application (heretofore referred to as the '740 application) describes a self-servo-writing process. The placement of new timing marks had previously occurred at least every other revolution to allow reading of, and measuring all the time intervals between, existing timing marks at least during a revolution before writing a subsequent new timing mark. In addition, with all of these processes only half of the timing mark locations are written at each radial position. This, unfortunately, can result in odd-even sector asymmetry, reduced signal strength at the timing mark, and increases the overall time between measurements during which the motor speed can significantly vary possibly introducing additional timing errors into measurements of timing mark locations.

Further, another type of reading and writing apparatus uses an offset head. In an "offset" head, the read and write elements are physically separated in the radial direction. An offset head includes a recording head, otherwise known as a write head, and a magnetic detection head, otherwise known as a read head. A prior art offset writing process requires that additional timing measurements be made to maintain process stability which adds to process time.

The invention of the '740 application overcame problems with the prior art by detecting both the passage of the timing marks and writing extensions to timing marks at substantially the same circumferential positions. This is feasible even if a disk drive or similar system is unable to write and read at the same time, if the read head is a separate element that encounters points on a disk surface slightly before the write head as the disk rotates so that the detection of an existing timing mark can take place before the writing of a timing mark in the same circumferential location. After the read operation occurs this delay allows the subsequent write operation at substantially the same tangential location on the same revolution. Using this process which records the passage of every timing mark and then writes extensions to all of those timing marks at substantially the same circumferential positions improves the accuracy of timing mark placement and produces a commensurate improvement in the placement of the concomitantly written servo data.

Another invention allows this last higher accuracy method where all timing mark locations are both detected and written during the same disk revolution to be executed without performing any other measurement steps except those made during that disk revolution. This reduces the overall process time. This invention is disclosed in co-pending U.S. Pat. application Ser. No. 09/426,435, filed Oct. 25, 1999 and entitled "Storage of Timing Information for Self-Servo Writing Timing Pattern Generation When Read and Write Heads are Non-Overlapping", which defines a location array which stores the estimated intervals between newly written timing marks calculated from the measured timing mark intervals of the timing marks that are detected by the read head and the delays used to write new timing marks in a data array. This U.S. Patent Application (heretofore referred to as the '435 application) is commonly assigned herewith to International Business Machines, and is hereby incorporated by reference in its entirety. At each new writing step the stored estimated interval data for the timing marks currently passing under the read head is retrieved and used to predict the correct delays for writing. This means it is not necessary to measure the time intervals between the timing marks passing under the read head before the disk revolution that new timing marks are written.

The combination of the inventions of the '740 application and the '435 application allows for both 1) high accuracy, since according to the invention of the '740 application every timing mark is both read and written on each step in the same revolution (rotation) of a disk in a drive, and 2) high process speed, since according to the invention of the '435 application it is not necessary to take the time to measure the time intervals between the timing marks passing under the read head before the disk revolution that new timing marks are written. However the invention of the '740 application requires particularly, heads that can read and then write at the same circumferential location on the same revolution via the presence of a significant delay that allows the subsequent write operation at substantially the same tangential location on the same revolution. The delay requirement also limits the duration (circumferential extent) of a timing mark that can be written since the reading of the timing mark must be completed before the write element reaches the leading edge of the set of extensions to that timing mark. This constraint limits the types of recording head and timing mark patterns that can be used with the higher accuracy method where every timing mark is both read and written in the same revolution.

Accordingly, there exists a need to overcome the problems with the prior art as discussed above, and particularly for a method to more effectively write timing marks on rotatable storage media.

SUMMARY OF THE INVENTION

Briefly, in accordance with the present invention, disclosed is a system and method for improved self-servowriting of multi-slot timing patterns. Individual timing marks are replaced with groups of timing mark slots. At each timing mark location, a time measurement is made by detecting a timing mark in one of the slots. Timing marks are written in other slots. The combination of timing measurements at every group and timing marks written at every group improves the overall precision of the timing propagation. The improved accuracy of timing mark placement produces a commensurate improvement in the placement of the concomitantly written servo-data. In addition, the alignment accuracy of the written pattern is less sensitive to variations in rotation speed and variations in the shape of written transitions. Moreover, only a single disk revolution is required at each servo radius to write servo data and propagate the timing marks to maintain timing alignment.

BRIEF DESCRIPTION OF THE DRAWINGS

The features and advantages of the present invention will become more apparent from the detailed description set fourth below when taken in conjunction with the drawings in which like reference numbers indicate identical or functionally similar elements.

FIG. 5. is a table of formulae for the write timing slots, read timing slots following incrementing, and write delays for different read slot cases, in one embodiment of the present invention.

FIG. 6. is a table of formulae for the write timing slots, read timing slots following incrementing, write delays and the correction parameter C for different read slot cases, in one embodiment of the present invention.

DETAILED DESCRIPTION OF THE PREFERRED EMBODIMENTS

The present invention is described in terms of the exemplary embodiments below. This is for convenience only and is not intended to limit the application of the present invention. In fact, after reading the following description, it will be apparent to one of ordinary skill in the relevant art(s) how to implement the present invention in alternative embodiments.

Actuator Geometry

Figure 1A:
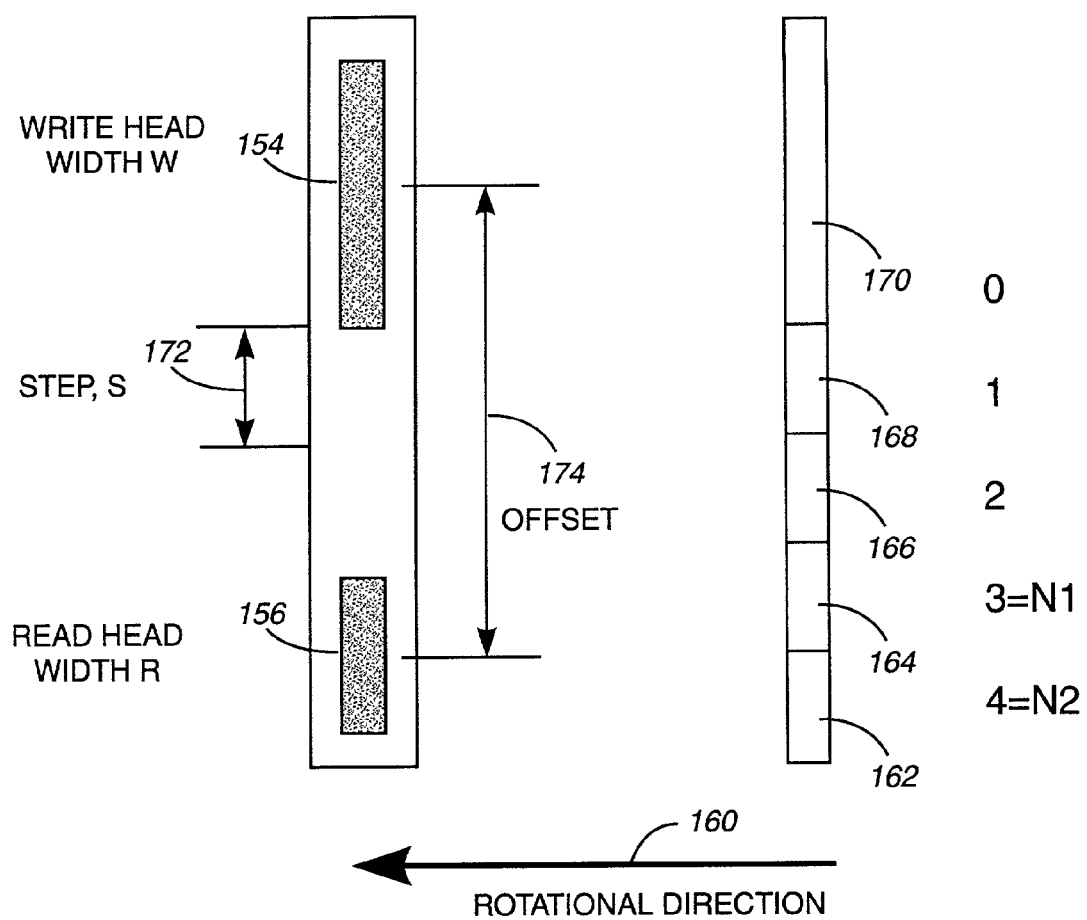
FIG. 1A is a diagram showing the arrangement of a timing mark and a recording transducer, which includes a write head and a read head, according to one embodiment of the present invention.
Figure 1B:
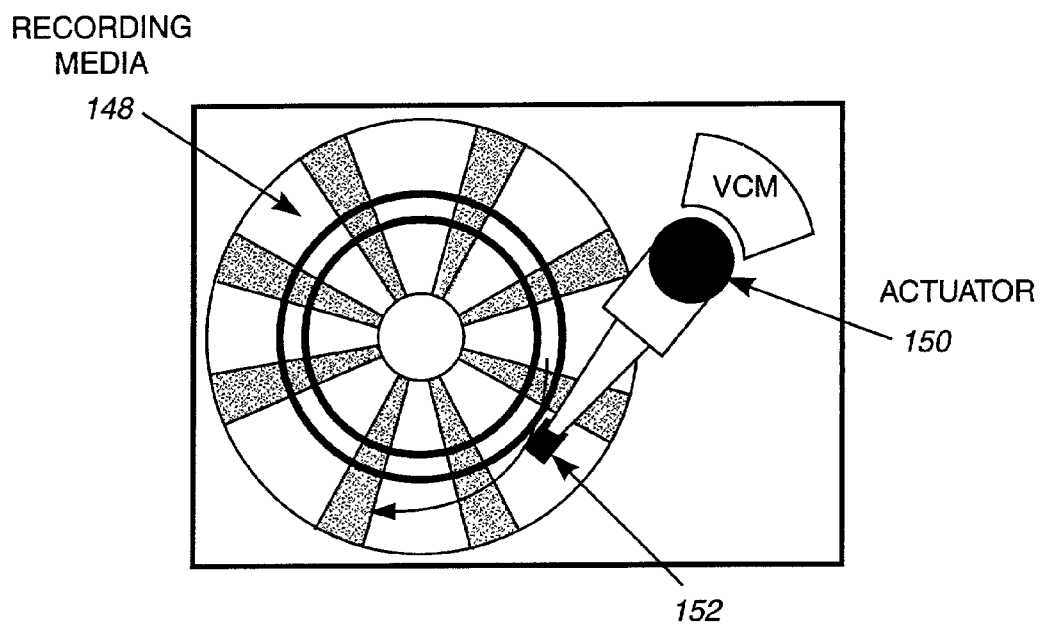
FIG. 1B shows a disk drive showing the arrangement of an actuator used to position a recording transducer on recording media, according to one embodiment of the present invention.

FIG. 1B shows a disk drive showing the arrangement of an actuator 150 used to position a recording transducer 152 on recording media 148, according to one embodiment of the present invention. The actuator 150 positions the recording transducer 152 to write tracks on the recording media 148 at any radial location. The actuator positional information may be derived from various methods well know in the art, either by self-servowrite radial propagation or by external sensors.

FIG. 1A is a diagram showing the arrangement of a set of timing mark extensions 160 and a recording transducer 152, which includes a write head 154 and a read head 156, according to one embodiment of the present invention. The direction of the media rotation 148 is counterclockwise which is shown as right to left in FIG. 1A for set of timing mark extensions 160. The timing marks are written sequentially and the direction of timing mark propagation is vertical (lower to upper). Disk tracks are shown as oriented horizontally in FIG. 1A. FIG. 1A shows the position of the recording transducer 152, which includes a write head 154 and a read head 156 relative to a set of timing mark extensions 160 at a fixed radial location.

Timing marks 162 thru 170 are written sequentially. Timing mark 162 is written first, followed by the writing of timing marks 164, 166,168 and finally 170. Each sequentially written timing mark overlaps the previously written timing mark. As shown in FIG. 1A, timing mark 170 overlaps 168,168 overlaps 166, 164 overlaps 162. As can be shown in FIG. 1A, the write head 154 does not overlap the same timing mark as the read head 156. That is, a timing mark cannot be written by the write head 154 and read by the read head 156 without changing the radial location of the actuator 152.

FIG. 1A shows that while read head 156 is positioned over the track area corresponding to timing mark 162, the write head 154 is positioned over the track area corresponding to timing marks 168 and 170. As explained above, chronologically, timing mark 162 was written first, timing mark 164 was written second, timing mark 166 was written third, timing mark 168 was written fourth and timing mark 170 was written fifth—the most recent.

Timing mark 164 is a timing mark extension of 162. A timing mark extension has been defined previously in the '740 application to be a timing mark written at least in part at the same circumferential location as, and coherently and aligned with, the data of some portion of an existing timing mark at a neighboring radial location such that some part of the two timing marks can be read simultaneously by the read head 156 at some radial position. The goal is to maintain a precise alignment of the timing marks so as to provide exact indicators of the rotational position of the disk during the servo-write process. Also, a radial trajectory is the area on a rotatable storage medium, such as a disk, that is defined by the area spanned by an initial timing mark and the set of timing mark extensions to that initial timing mark. An approximation to the final written radial trajectory may be predetermined as a target trajectory along which the timing marks are to be written.

Thus, at a given radial position, read head 156 can read timing marks 162 and 164, which were written three and four timing steps back, respectively. This feature is a result of the width of the read head 156, the width of the write head 154, the radial separation 174 between the read head 156 and the write head 154, called the head offset, and the radial length of the timing marks from 162–170. The radial length of the timing marks 162–170 is set by the step size of the radial step between timing mark extensions 172. In another embodiment of the present invention, the distance between the read head 156 and the write head 154 is such that the read head 156 can read timing marks which were written a predetermined number of timing steps back. The parameter N1 as shown in FIG. 1A is defined as the integer part of (largest integer less than) the ratio of the read to write radial head offset 174 minus half the write head width 154 over the step size S, given by:

N1=Integer part of (Offset−Write/2)/S

Further, N2 is defined as N1+1.

Figure 7:
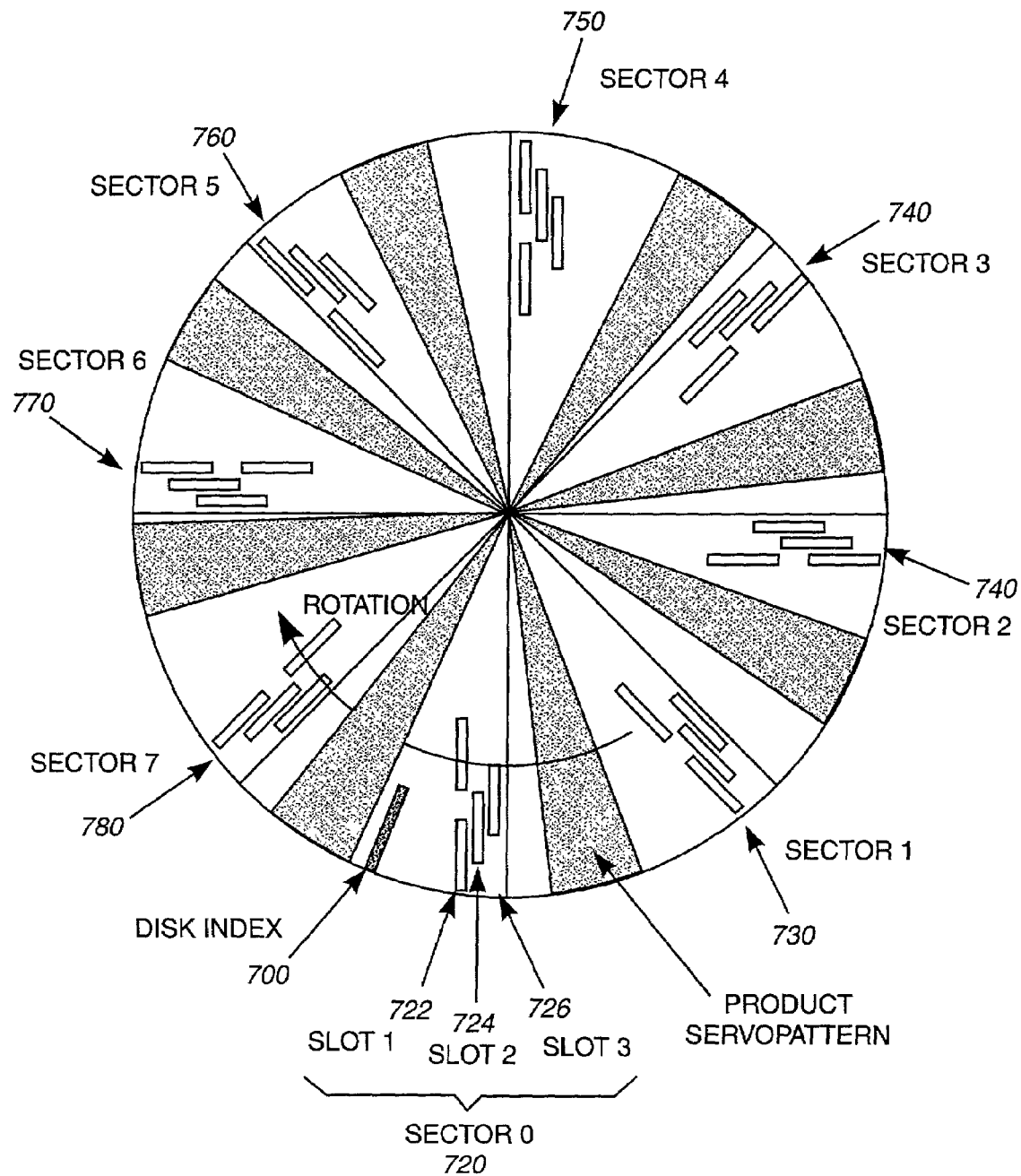
FIG. 7 is a diagram of the sector layout of timing mark groups on a rotating media, in one embodiment of the present invention.

In one embodiment of the present invention, each track of a disk is divided into V sectors, wherein V is a whole number multiple of the product sector count as shown in FIG. 7 where V=8. Within each sector, there are M possible timing slots wherein M is a whole number greater than two. In one example, as shown in FIG. 7, M=3. In the preferred embodiment of the present invention, timing marks are grouped together with a fixed time interval t between each timing mark. The time interval t between the timing marks is determined by the velocity of the recording media upon which the timing marks are recorded and the distance between the timing marks d and is given by: t=v/d, where v is the velocity of the recording media.

The total time interval between the first and second timing mark locations must be of sufficient time so that after a timing mark is written in the first timing mark location, the read head 156 and read back electronics in the disk drive have substantially recovered from the disturbance caused by writing prior to the read head passing over beginning of the second timing mark. A similar duration is maintained between the penultimate and last timing mark locations. In the preferred embodiment, M is 3 and the physical location of the timing slots are defined so that slot 1 722 begins some fixed time as the disk rotates after the disk index 700 in FIG. 7. Slot 2 724 begins a fixed time, t, after the beginning of slot 1 722 such that t is equal to or greater than the sum of the time required to write a timing mark and the maximum time required by the read and write heads and electronics to substantially return to their steady state condition. Slot 3 726 begins the time t after the start of slot 2 724. In a preferred embodiment all written timing marks for a group are written separated by times which are the same for all timing groups, but the times may be chosen to be different.

Timing Mark Arrangement

Figure 2:
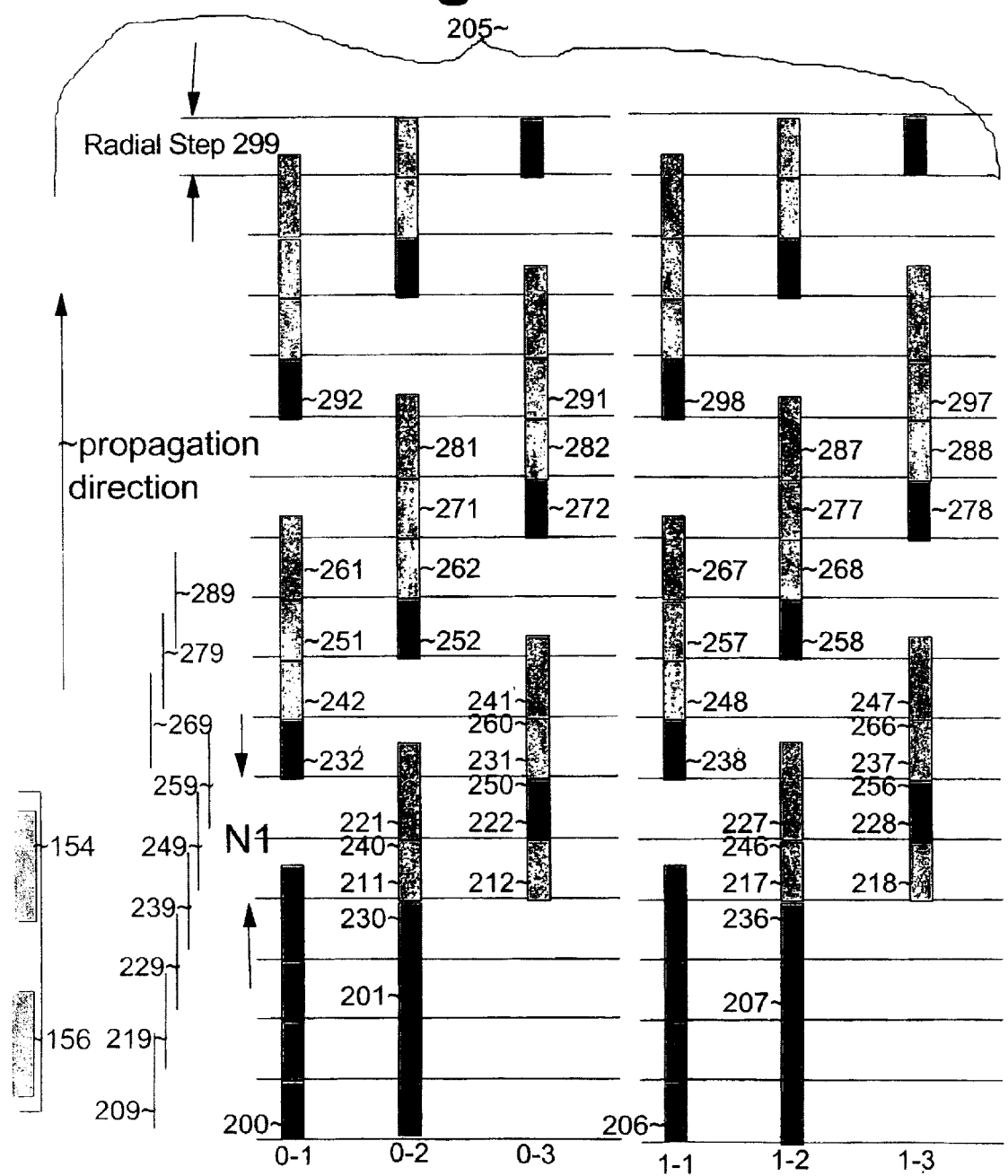
FIG. 2 is a grid showing the arrangement of generated timing marks, according to one embodiment of the present invention.

FIG. 2 is a grid showing the arrangement of generated timing marks, according to one embodiment of the present invention. FIG. 2 shows the detailed arrangement of timing marks for sector 0 720 and sector 1 730 of FIG. 7. The direction of disk rotation in FIG. 2 is horizontal (right to left) while the direction of timing mark propagation is vertical (lower to upper). Grid 205 shows the locations on a disk, onto which timing marks are written within each sector. The vertical columns (0-1, 0-2, 0-3) represent the timing slots available for timing marks, while the rows corresponds to tracks of the recording media. Two sectors are shown in FIG. 2, each containing three timing slots in what is referred to as a timing mark group. The first timing mark group, group 0 labeled 0-1 ,0-2, 0-3, is shown in the first three timing slots (columns) of the grid. The second timing mark group, group 1, labeled 1-1, 1-2, 1-3, is shown in the second three timing slots (columns) of the grid. At the left of the grid are lines indicating the radial locations of the read head, labeled 209 to 289. The filled and shaded boxes indicate timing marks. For example, when the read head is located at the radial position 239 the write head is at a radial position to write timing marks at 232, 231, 238, and 237. For the purpose of FIG. 2, N1 as described above is chosen to be two (N1=2) as an example. In the preferred embodiment, the offset is a slowly varying function of the actuator position and can be any value greater than or equal to two radial steps.

The present invention describes how to extend a start-up pattern of timing marks (crosshatched in FIG. 2) 200, 201 and 206, 207 so as to maintain time alignment. It is assumed for this discussion that the start-up timing marks 200, 201 and 206, 207 have already been written via prior art. The description of the invention focuses on the writing of timing mark group 1. It is also assumed that all other timing mark groups are written in the same manner as timing mark group 1, as described herein. In the preferred embodiment of the present invention, three timing slots are shown for each timing mark group. In another embodiment of the present invention, any whole number of timing slots greater than 2 are used for each timing mark group. When a timing mark is written one radial step later and at the same timing mark slot as a previously written timing mark, a radial portion of the previously written mark is overwritten (erased and replaced) by the new timing mark. For example, the timing mark 211 has been partially overwritten by the timing mark 221. The timing mark 261 has no immediate successor in timing slot 1, so it is not overwritten.

As a introduction to the detailed discussion of FIG. 2 to follow, the rules governing the sequence of writing and reading can be summarized. In the preferred embodiment, with three timing slots in each group, the time of passage of one timing mark is recorded (read) and two timing marks are written at the same radial position. Servodata is written between the timing mark groups using the time of passage of the read timing marks to maintain servopattern timing alignment as shown in FIG. 7.

The sequence of reading and writing the timing patterns in the timing slots is described. The process begins with reading one timing mark and writing the other two timing marks for a single revolution of the disk. At the next radial step, the sequence proceeds as follows:

1. If the read timing slot has been repeated for a number of radial steps less than N1, keep the read timing slot the same.

2. Otherwise change the read timing slot, in the preferred embodiment, increment the read timing slot by one or, if the current read timing slot is the last one (e.g. slot 3 in FIG. 1), then set it to the first read timing slot.

In FIG. 2, timing marks shaded with diagonal lines are those that are written in timing slots directly following the read timing slot, while the uniformly shaded timing marks are written in the remaining timing slot.

In an embodiment of the present invention, with reference to grid 205 of FIG. 2, the timing pattern generation process begins with the positioning of the actuator 152 such that the read head 156 is positioned at 219.

As explained above, the geometry of the recording transducer results in the write head 154 being positioned over 211 and 217. Timing marks are written in pairs. The time of passage of timing mark 200 is recorded and the first timing mark is written at 211, in the second timing slot. The next timing mark is written at 212, in the third timing slot. As the disk continues to rotate, the time of passage of the timing mark in the first timing mark slot (206 for group 1) is recorded and additional timing marks are written in slots 2 and 3 (217 and 218 for group 1) for each successive timing mark group. Writing in slots 2 and 3 and reading in slot 1, continues until the last timing mark group in sector V-1 has passed under the recording transducer.

Next, the recording transducer 152 is positioned such that the read head 156 is positioned at 229. Again the timing mark 200 is read (the term "read" is used as a shorthand for observing the read back signal and recording the time of passage of the timing mark in a timing slot.) in slot 1, and the next pair of timing marks are written at 221 and 222. Writing and reading continues in successive timing mark groups as the disk rotates until the last timing mark groups V-1 have passed under the recording head. In the remainder of this discussion, writing and reading continues in successive timing mark groups as the disk rotates until the last timing mark groups V-1 have passed under the recording head will be assumed whenever writing of timing marks is described.

At this juncture, the recording transducer 152 has moved N=2 steps while reading in the first timing slot. For the case described by FIG. 2, where the read to write head offset is such that N1=2, two is the number of timing steps before the reading is moved to the next timing slot. Having moved two steps, the read timing slot is incremented, in this case to slot 2. This is a result of the radial separation between the write head 154 and the read head 156, as explained previously in the invention, moving to the next timing slot after a number of steps equal to N1 has beneficial features because it creates timing marks that provide a reference which is dependent on more than one timing slot. The origin of these benefits will be described more fully below.

Next, the recording transducer 152 is positioned such that the read head 156 is positioned over 239. The next pair of timing marks are written at 231, in the third timing slot, and 232, in the first timing slot. The recording transducer 152 is then positioned such that the read head 156 is positioned over 249. The next pair of timing marks are written at 241 and 242. At this juncture, the actuator 152 has moved N=2 steps in the second timing slot. As before, two is the maximum number of timing steps allowed before the read slot 152 is required to move to the next timing slot. Since the previous read was in the second timing slot, the read timing slot is moved to the third or last slot. Next, the recording transducer 152 is positioned such that the read head 156 is positioned over 259. Timing marks are written at 251 and 252. The recording transducer 152 is then positioned such that the read head 156 is positioned over 269. The next pair of timing marks are written at 261 and 262.

As before, the actuator 152 has moved N=2 steps, the maximum for the current head offset, in the third timing slot. Thus, the read slot moves to the next timing slot, since the previous timing slot was the last, the read timing slot is moved to slot 1, the first. The recording transducer 152 is then positioned such that the read head 152 is positioned over 279. The arrangement of read slots and write slots are the same as at step 1, when the read head was positioned at 219. The timing mark in the first slot is read and the other timing slots in the group written in an analogous way. The process of writing timing marks and incrementing the read slot every time the number of steps moved is equal to N1 is repeated until the complete servo pattern has been written across the disk.

One advantage of the present invention is that in each contiguous section of timing marks in each timing slot (e.g., 212, 231, 241) there are at least two radially adjacent timing marks that have been written while reading timing marks in different timing mark slots. The sequence of writing and reading is defined so that at a subsequent radial position the read head is in a position so that it spans portions of both of these timing marks while additional timing marks are written. In the preferred embodiment, this event occurs at the last step before the read slot is incremented. An example is when the read head is positioned at 259 and reading occurs in slot 3 at the timing mark indicated by 250. At this position, the timing mark is made up of 222, written when the read slot was timing slot 1 and 231 written when the read timing slot was slot 2. These features are beneficial because they provide a reference which is dependent on more than one timing slot, which couples timing information between all three timing slots. This prevents timing mark errors from propagating by linking the propagation in each slot to two (or both in the preferred embodiment) of the other slots. In the absence of this three-slot coupling, errors in the relative position of timing marks in different timing slots can accumulate and degrade the accuracy of the timing placement.

Alternative embodiments that preserve this coupling or linking of multiple timing slots are readily constructable. In one alternative embodiment timing marks are written in only a single timing mark slot where the timing mark in the other write timing slot will never be read. In one alternative of this embodiment, timing marks 228, 237 and 247 would be written but 218 would not. Both 227 and 228 would be written so that the adjoining timing marks 228 and 237, which are written while reading in different timing mark slots (0 and 1) respectively, would still be present. In another embodiment, the order of the timing marks is rearranged. For example, slot 2 could be placed physically before slot 1, or after slot 3, or the slot order could be reversed. One skilled in the art can devise further arrangements trivially. The preferred embodiment described here uses the minimum number of timing marks and is convenient because there are relatively few distinct process steps.

Timing Mark Generation Process

Figure 3:
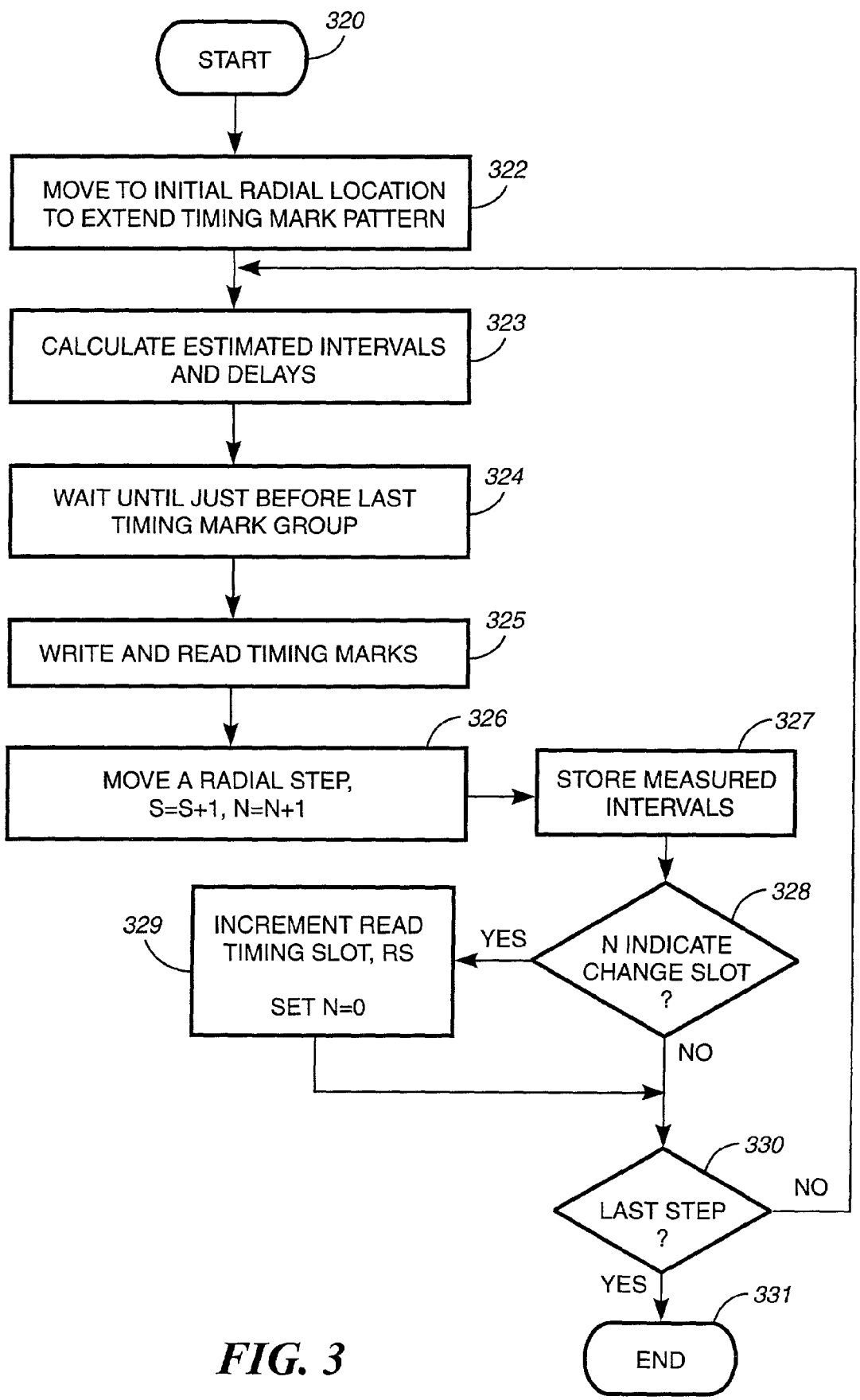
FIG. 3 is a flowchart depicting the overall operation and control flow of the timing mark generation process, in one embodiment of the present invention.

FIG. 3 is a flowchart depicting the overall operation and control flow of the timing mark generation process, in one embodiment of the present invention. Control flow begins with step 320 and flows directly to step 322.

In step 322, the recording transducer 152 is moved to an initial radial location using actuator 150 where the read head 156 passes over the start-up pattern of timing marks (200, 201, 206, 207 in FIG. 2.) and the write head 154 is positioned radially to write extensions to the start-up timing pattern. In addition, the variable N, representing the number of timing steps in the current timing slot, is defined as zero. The read timing slot, RS is selected as slot 1. The first write timing slot WS1 is set to slot 2. The second write timing slot, WS2 is set to slot 3.

In step 323, the estimated intervals are calculated from interval data stored during the start-up pattern generation. The derivation of the estimated intervals, write delays and storage of measured intervals will be described later. In the absence of start-up interval data, the intervals between timing marks in the read timing slot can be measured during a disk rotation. In step 324, the process holds during the disk rotation until just prior to the passage of the V-1 timing mark group. In step 325, the times of passage of timing marks in the read timing mark slots are recorded and timing marks are written in the other timing mark slots. The details of step 325 are explained further in the discussion of FIG. 4 below, which describes two preferred embodiments of the invention.

In step 326, the recording transducer 152 is moved to a radial position one servo step further from the starting point. The step numbers S and N are incremented. In 327 the intervals between the times of passage of the timing marks in the read slots are stored, along with the parameter C, following the formulae described in the next section. In step 328 the value of N is examined to determine how many radial steps have been made using the current timing slots. If N is equal to N1, as described in FIG. 1, the process moves to step 329 where N is set to zero and then to 330, otherwise the process moves directly to step 330. In step 329 the read timing slot, RS, is incremented to the next later timing slot, unless the read slot is the last (third) timing slot in the timing mark group, in which case the read slot is set equal to the first timing slot—that is, RS=RS+1 unless RS=3, then RS is set to 0.

In step 330, the number of completed radial steps S is checked. If this is equal to the number of steps in the servopattern, the process completes by exiting in step 331; otherwise the process returns to step 323 to continue stepping radially and writing timing marks and the product servopattern. It should be noted that the product servopattern may be written during the timing propagation process, but may also be written after the timing propagation is completed.

Figure 4A:
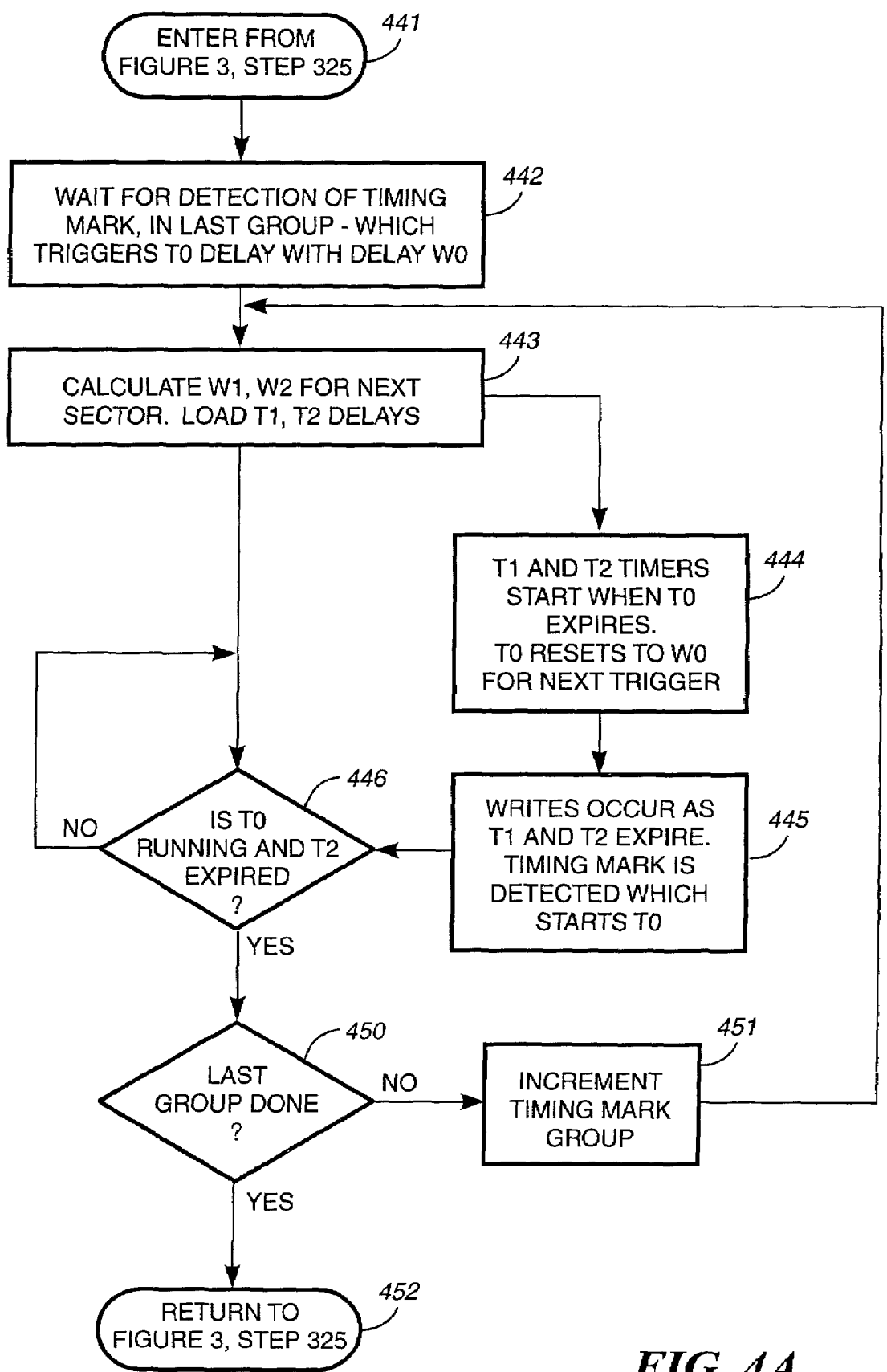
FIG. 4A and FIG. 4B are flowcharts depicting a detailed description of one step in the operation and control flow of the timing mark generation process, in two different embodiments of the present invention.
Figure 4B:
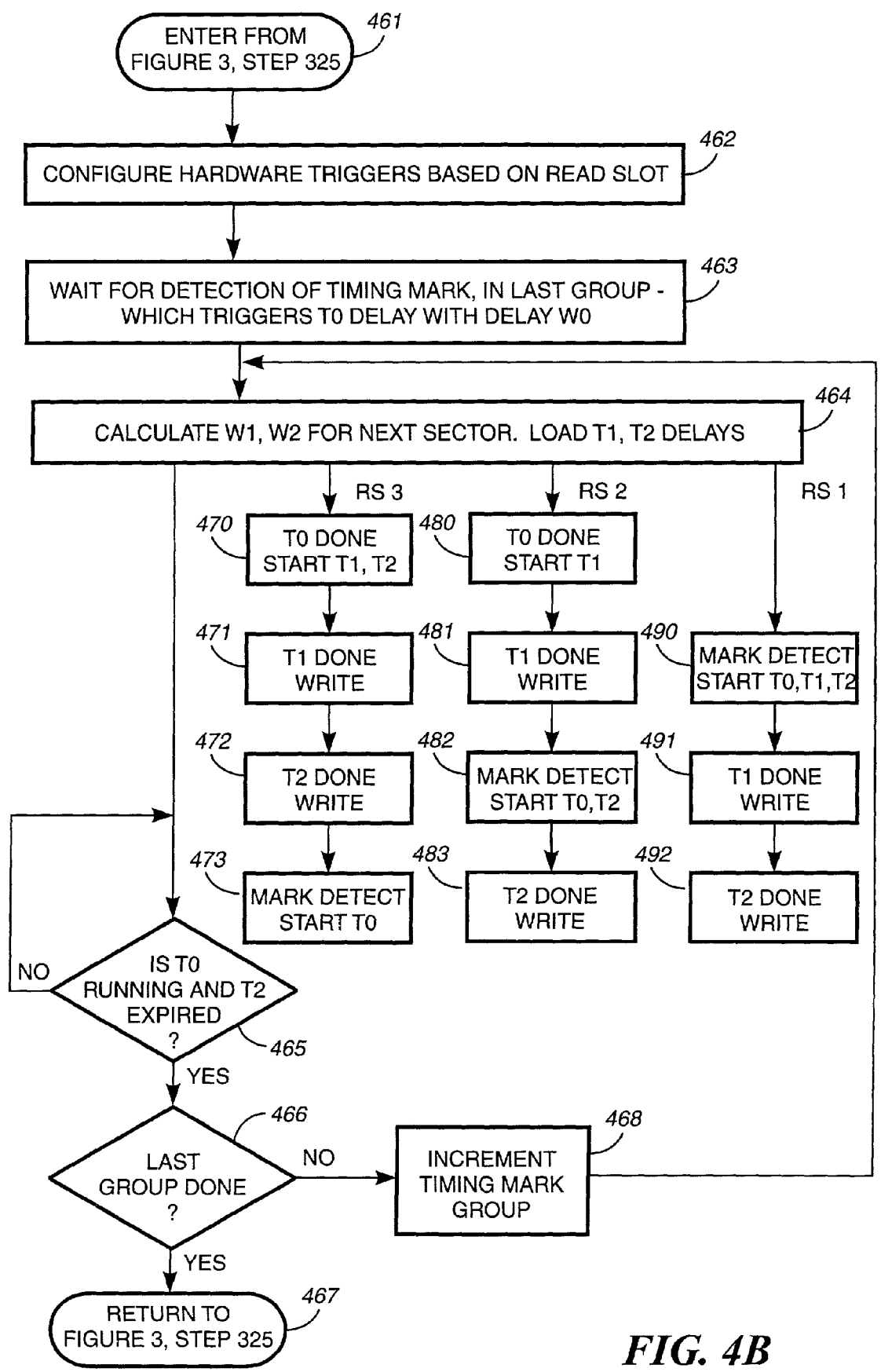

FIG. 4A and FIG. 4B are flowcharts depicting a detailed description of one step (325)in the operation and control flow of the timing mark generation process, in two different embodiments of the present invention. FIG. 4A and FIG. 4B describe the details of the process step wherein the passage of timing marks in the read slots is recorded and new timing marks are written. FIG. 4A illustrates process steps for a first preferred embodiment which shall be referred to as Write While Read (WWR). FIG. 4B illustrates the process steps for a second preferred embodiment which shall be referred to as Direct Write While Read (DWWR).

Write While Read Process

The details of step 325 in FIG. 3 are described in more detail for the WWR process in FIG. 4A by breaking step 325 into sub process steps 441 to 452. Step 325 enters the process of FIG. 4A with step 441. In the previous step (324) in FIG. 3, the process has waited until just before the last timing mark group. Following step 441 is step 442 where the timing mark group index, i, is set to the last timing mark group V-1 and the process waits for the timing mark. The passage of the timing mark triggers the start of the hardware delay TO with time WO. In the next step 443, we calculate the delay times for the write delays W1 and W2 for the first and second write timing slots respectively via the formulae described in the next section and in FIG. 5. The flow diagram is shown split in the next step between the flow control function 446 and the simultaneously occurring sequence of hardware processes 444 and 445. The control flow goes to 446 from 443 and the process waits for both the TO delay to be started and for the T2 delay to elapse, which indicates the completion of the timing mark group.

During this wait the hardware timer TO expires which starts the T1 and T2 timers 444. The TO timer automatically resets to the delay WO on expiration. As the T1 and T2 timers expire 445 they trigger the writing of new timing marks in two of the timing marks slots. Also, the timing mark in the read slot is detected which starts the timer TO again. When TO has been started, indicating the timing mark has been read, and T2 has expired, indicating two timing marks have been written, the process control 446 moves on to step 450.

In step 450, the process checks to see if the last timing mark group has passed—that is, whether i=V-1, indicating that timing marks have been read or written at all timing mark slots around the circumference of the disk in which case the process moves to step 452 and returns to FIG. 3; otherwise the process moves to step 451. In step 451, the timing mark group index "i" is incremented. Following step 451 the process returns to step 443 to continue in the next timing mark group reading a timing mark and writing two timing marks.

In this particular embodiment it should be noted that because the two written timing marks of each group are written with a spacing determined without reference to the read timing mark of that group, they can be considered to be a single, long timing mark with blank space(s) in it. Obviously the composition of this mark changes with radial position (read and write slot number).

Direct Write While Read

The details of step 325 in FIG. 3 are described in more detail for the DWWR process in FIG. 4B by breaking step 325 into sub-process steps 461 to 492. Step 425 enters FIG. 4B with step 461. In the previous step 324 in FIG. 3, the process has waited until just before the last timing mark group. Following step 461, is step 462 where the hardware triggers are configured to start each of the delays T1 and T2 on either the detection of the timing mark or the elapsing of delay TO, depending on the read timing mark slot as indicated in FIG. 6. The process waits in step 463 until the read timing mark in the last timing mark group (V-1) has passed, which triggers the start of delay TO with delay WO.

In the next step 464, we calculate the delay times for the write delays W1,W2 for the write timing delays T1 and T2 via the formulae described in the next section and in FIG. 6. Control flow is shown split in the next step to show the simultaneous control flow 465 and hardware processes. The hardware steps vary depending on the read timing slot indicated by the RS value of 1, 2 or 3 as indicated in FIG. 4B. After step 464, the process control section waits at step 465 for TO to be running and T2 to have expired.

In the case where the read timing slot is 3, the hardware is configured so that when TO expires 470, it starts delays T1 with delay time W1 and delay T2 with delay time W2. The timer TO automatically resets to the delay WO on expiration. When T1 expires 471, a timing mark is written in slot 1. Next, when timer T2 expires, a timing mark is written in timing mark slot 2. Finally in step 473, the timing mark in slot 3 is detected, starting timer TO again.

If the read timing slot is slot 2, the hardware is configured so that when TO expires 480, it starts timer T1. The timer TO automatically resets to the delay WO on expiration. When T1 expires 481, a timing mark is written in slot 1. Next in step 482, the timing mark in slot 2 is detected, starting timer TO again and timer T2. Next, when timer T2 expires 483 it causes the write of a timing mark in timing mark slot 3.

If the read timing slot is slot 1, first the timing mark in slot 1 is detected 490, starting timer TO, T1 and T2. TO expired previously but is not configured to start any delays. When T1 expires 491, a timing mark is written in slot 2. Next, when timer T2 expires 492, it causes the write of a timing mark in timing mark slot 3.

Regardless of the read timing slot, each of hardware processes completes the current timing mark group with TO running and T2 expired. When this happens, the control flow step 465 continues to step 466. In step 466, the process checks to see if the last timing mark group has passed—that is, whether i=V−1, indicating that timing marks have been read or written at all timing mark slots around the circumference of the disk, in which case the process returns to FIG. 3 at step 467; otherwise the process moves to step 468. In step 468, the timing mark group index "i" is incremented. Following step 468, the process returns to step 464 to begin reading and writing in the next timing mark group.

Delay Calculations

The present invention follows a technique disclosed in the '435 application, which defines a location array that stores the location of the i-th timing mark group or an array of timing mark intervals. In the preferred embodiments of the present invention, we define an array of stored intervals AI; S corresponds to the radial position (or radial step or track number) of recording transducer 152, while "i" represents the sector number within which a timing mark is written, such that:

$$AI=IM-A+D-D$$

$$AI=IM-A+D-D$$

where IM is the time of passage of the timing mark in read timing slot of the "j"th timing mark group minus the time of passage to the timing mark in the read timing mark slot of the "k"th timing mark group during the disk revolution where the writing of new timing marks is taking place at the "S"th radial step. We will use the variable D to represent the sum of the systematic plus random_error terms as defined in the '740 application. We will use the variable A to represent any corrections to the interval for variations in the rotation speed, following the methods of prior art. Finally we will describe how to use those delays in the WWR and DWWR embodiments for writing for the case of timing mark groups. Also, the index S is incremented after each radial step. In the preferred embodiment, to reduce the size of the data array, modulo K arithmetic is used for the index S where K is a number at least 1 larger than the maximum read to write radial head offset. While not shown explicitly, modulo arithmetic is implied for S everywhere. Also, modulo arithmetic is implied for the interval indices "i".

Derivation of Intervals and Write Delays

The '435 application also teaches the calculation of current estimated intervals I from stored information. The estimated intervals can be used to calculate write delays which indicate how long after a timing mark the write should be executed to extend the existing timing marks optimally. The "i" index is defined as before to indicate the "i"th timing mark group.

In the preferred embodiments of the present invention the estimated intervals are:

$$I=AI^*F1+AI^*F2$$

where the parameter N3 is the integer part of the current read to write radial offset measured in servo steps, and F1 and F2 as defined in the '435 application. In a preferred embodiment, if the fractional part of the of the current read to write radial offset measured in servo steps is less than 0.2, then set F1=0.2; if the fractional part of the of the current read to write radial offset measured in servo steps is greater than 0.8, then set F1=0.8; otherwise F1 is the fractional part of the current read to write radial offset measured in servo steps. In this same embodiment F2=1−F1.

The '740 application teaches how to calculate delays between timing mark detections and writing of extensions to those timing marks for the case of single timing marks rather than timing mark groups, using intervals measured or estimated between single timing marks: delays between the detectable timing marks and the desired writing locations for additional marks are calculated utilizing the estimated time between the previous timing mark and the one being extended. The estimated times between the previous timing mark and the one being calculated can be preferably corrected for systematic delays according to the teachings of U.S. Pat. application Ser. No. 09/550,643 and U.S. Pat. application Ser. No. 08/882,396 (now U.S. Pat. No. 5,901,003), which are commonly owned by the assignee of the present invention and are incorporated herein by reference in their entirety. Additionally, in a preferred embodiment, corrections for errors accumulated from previous process steps are introduced according to the teachings of U.S. Pat. application Ser. No. 09/316,884, U.S. Pat. application Ser. No. 09/316,882, and U.S. Pat. application Ser. No. 08/891,122, which are all commonly owned by the assignee of the present invention and are incorporated herein by reference in their entirety.

The '740 application teaches two embodiments with different delays for writing. The first embodiment is equivalent to the embodiment of the current invention called WWR. In this embodiment, the delay for writing is either the estimated or measured interval between the timing mark from which a delay is measured and the timing mark at the circumferential position to be written, plus the systematic and random error corrections:

$$delay=interval+systematic+random\_error.$$

The second embodiment is equivalent to the embodiment of the current invention called DWWR. In this embodiment, the delay for writing is the sum of systematic and random error corrections:

$$delay=systematic+random\_error.$$

The '740 application then teaches how to calculate delays for writing from (estimated) intervals. We will use the variable D to represent the sum of the systematic plus random_error terms as defined in the '740 application We will use the variable A to represent any corrections to the interval for variations in the rotation speed, following the methods of prior art. Finally we will describe how to use those delays in the WWR and DWWR embodiments for writing for the case of timing mark groups.

Calculations of Delays for Writing (WWR Embodiment)

FIG. 5 is a table of formulae for the write timing slots, read timing slots following incrementing, and write delays for different read slot cases, in one embodiment of the present invention. FIG. 5 summarizes parameters and formulae for the write delays W1 and W2 for the preferred WWR embodiment for each of the read slot locations. For example, if the read time slot is slot 1, the delay W1 set for the T1 delay timer when the group index is "i" is W1=D+I+A−WO+d where D is the sum of the interval+systematic+random_error as defined in the '740 application for the "i" timing mark. The estimated intervals used to calculate the interval, systematic delay and random_error terms have been replaced by the estimated interval as defined above and in the '435 application, and d is the predetermined time spacing between timing mark slots as defined earlier, and WO is the predetermined delay for the timer TO.

Calculations of Delays for Writing (DWWR Embodiment)

FIG. 6 is a table of formulae for the write timing slots, read timing slots following incrementing, write delays and the correction parameter C for different read slot cases, in one embodiment of the present invention. FIG. 6 summarizes parameters, hardware configuration and formulae for the write delays W1 and W2 for the preferred DWWR embodiment for each of the read slot locations. For example if the read time slot is slot 1, the delay W1 set for the T1 timer when the group index is "i" is W1=D+d−CC where D is the sum of the systematic+random_error as defined in the '740 application for the "i" timing mark. The measured or estimated intervals used to calculate the interval, systematic delay and random_error terms have been replaced by the estimated interval as defined in the '435 application using the definition of the stored intervals modified as described above. The parameter CC is defined below.

For another example, if the read slot is 2, the delay time W2 is D+I+A−d−CC for the T2 delay timer for the "i"th timing mark group. FIG. 6 also indicates the hardware triggering setup of the timers T1 and T2. These two timers can be configured to be automatically started by either the detection of a timing mark or the elapsing of delay timer TO, with the configuration depending on the current read timing slot as indicated in the table of FIG. 6. For instance, if the read timing slot is 2, the T1 delay is started by the elapsing of delay timer TO while the delay timer T2 is started by the detection of the timing mark.

In the DWWR preferred embodiment of the present invention, we define a correction term C, indexed by step number and timing group number in a way analogous to the stored timing mark locations L. Equations for C are given in the next section. C provides an estimate the amount which the location of a timing mark must be corrected in order to reflect the ideal position of that timing mark. When timing marks are written based on the time of passage of a previous timing mark group, rotation speed variations and position errors in the previous group can introduce errors in the placement of the new timing mark. C stores the estimate of this error based on the time of passage of a timing mark in the current timing mark group. Initially, all of the values of C are zero. Formulae for C are given in the table of FIG. 6 for the current read timing slot in terms of the measured interval IM and the write delays W1 and W2 and number of steps, N, taken at the current read timing slot location and the current read to write offset.

For example, if the read timing slot is 2 and the parameter N is equal to N1, then C is IM−W2−d. If the read timing slot is 2 and the parameter N is less than the integer part of the read to write offset N1, C is zero as shown in the table of FIG. 6.

The current estimate of the correction term is defined, indexed only by "i", CC. In the preferred embodiment of the invention $$CC = F1^*C + F2^*C.$$

The parameters F1 and F2 are weighting factors that are a function of the head offset. In the preferred embodiment, N3, F1 and F2 are the same factors defined above. Thus, the misplacement of the detectable timing mark is assumed to be the weighted average of the stored estimates C, C, with the weighting being determined by the relative fractions of the read head falling over the portions of the timing mark written N3 and N3+1 steps back. In an alternative embodiment, $C = \text{sum } j=0 \text{ to } k \{Fj^*C\}$ where the Fj are a set of k weighting factors applied to a number of stored data sets Nj back in the indexing.

The current estimate of the correction factor CC is used when the placement of a new timing mark is determined by detecting the passage of timing marks which were themselves written at a position determined by a delay following a timing mark in the previous timing mark group. The correction shifts the time of writing of the new timing mark to account for the misplacement (CC) of the timing mark that starts the write delay timer.

Exemplary Implementations

While the invention is shown for a rotational recording media, the invention can be implemented for any system in which the recording media moves along any arbitrary trajectory including but not limited to linear motion.

The present invention can be realized in hardware, software, or a combination of hardware and software. A system according to a preferred embodiment of the present invention can be realized in a centralized fashion in one computer system, or in a distributed fashion where different elements are spread across several interconnected computer systems. Any kind of computer system—or other apparatus adapted for carrying out the methods described herein—is suited.

Figure 8:
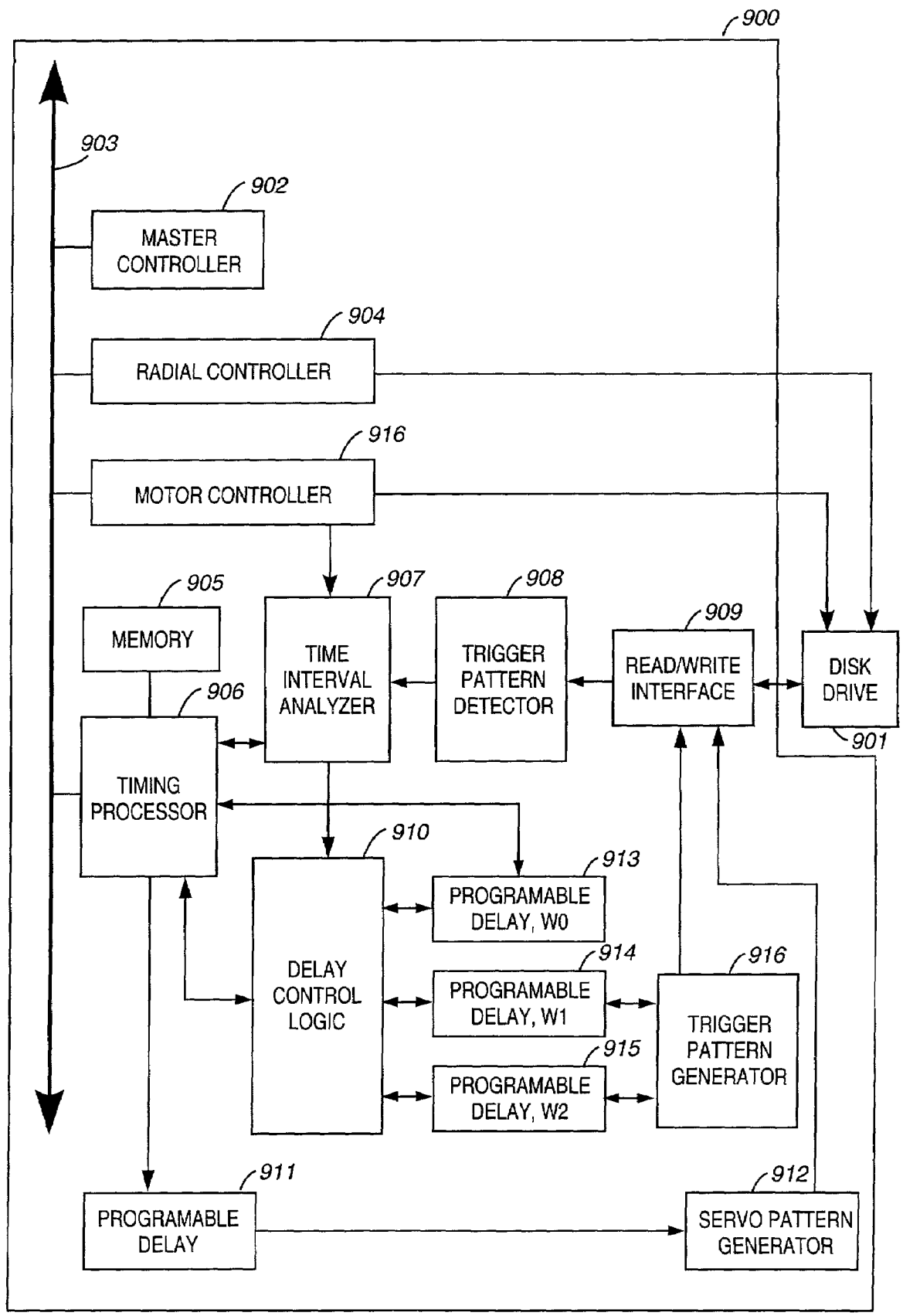
FIG. 8 is a block diagram of an exemplary self-servowriter timing system useful for implementing the present invention.

A preferred embodiment of the invention can be realized in a system 900 combining a computer system and software with specialized electronic hardware as illustrated in FIG. 8. In FIG. 8, a master controller 902, which may be a computer or signal processor governs the overall sequence of operations and communicates over a communication bus 903 with subsystem elements such as a radial position controller 904, motor controller 916 and timing processor 906. The radial controller 904 sets the position of the actuator arm and may be one of several types including mechanical positioners or radial self-servowrite positioning systems. The motor controller spins the disk drive motor and provides a motor index to the timing interval analyzer. The timing processor 906 manages the selfservowrite timing functions of the current invention. The processor controls the process sequence. Such a processor can have attached memory 905. Time measurement functions can be performed by time interval analyzer electronic 907 which measures the time intervals between trigger patterns detected by the trigger pattern detector 908 and trigger patterns and the motor index from the motor controller. Power and control signals to, and readback signals from, the disk drive being written 901 pass through the read/write interface 909. The write control signals for the timing mark trigger patterns are generated in the trigger pattern generator 916. The trigger pattern generator causes the writing of a new timing mark when started by one of the programmable delays W1, 914 or W2, 915. Another programmable delay WO, 913 is used as described in the text earlier to control the starting of the W1 and W2 delays and the process sequence. The selection of timing trigger signals from the time interval analyzer, and WO,W1 and W2 delays to start the other delays is controlled by the delay control logic 910. The writing of the actual servo pattern data is controlled by the servopattern generator, with the timing of the servo data placement controlled by the programmable delay 911.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for propagating a plurality of timing marks for servo data alignment on a storage medium, the method comprising:

detecting a passage of at least a portion of a first timing mark from a set of timing marks, wherein the first timing mark is located at a first radius and a first circumferential location;

waiting for a delay period to expire and writing a second timing mark, wherein the second timing mark is located at a second radius and a second circumferential location and wherein the second timing mark is not a radial extension of a previously written timing mark; and moving a read write head one step radially.

2. The method of claim 1, further comprising:

detecting an extension of the first timing mark, waiting a predefined period of time and writing a second timing mark extension to the second timing mark and a third timing mark extensions to a third timing mark.

3. The method of claim 2, further comprising:

repeating the detecting of the first timing mark, waiting a specified period of time and writing extensions to the second timing mark and the third timing marks for a predetermined number of radial steps N1.

4. The method of claim 3, wherein N1 is equal to a number of radial steps closest to a read to write radial offset of a recording head minus half a write head width of the recording head, measured in units of a radial step distance.

5. The method of claim 2, further comprising:

repeating the detecting of the first timing mark, waiting a specified period of time and writing extensions to the second timing mark for a predetermined number of radial steps N1.

6. The method of claim 2, further comprising:

repeating the detecting of the first timing mark, waiting a specified period of time and writing extensions to the third timing mark for a predetermined number of radial steps N1, as the writing of extensions of a timing mark in a second position is omitted.

7. The method of claim 2, further comprising;

repeating the detecting of the first timing mark, waiting a specified period of time, writing a timing mark extension to the second timing mark for a predetermined number of radial steps N1 and writing a timing mark in a fourth circumferential position.

8. The method of claim 2, further comprising:

repeating the detecting of the first timing mark, waiting a specified period of time, writing a timing mark extension to the third timing mark for a predetermined number of radial steps N1 and writing a timing mark in a fifth circumferential position.

9. The method of claim 1, further comprising:

detecting an extension of the first timing mark, waiting a predefined period of time and writing at least one timing mark extension to the second timing mark.

10. The method of claim 1, further comprising:

detecting an extension of the first timing mark, waiting a predefined period of time and writing at least one timing mark extensions to a third timing mark as a writing of at least one extensions of a timing mark in a second location is omitted.

11. The method of claim 1, further comprising:

repeating the detecting of an extension of the first timing mark, waiting a specified period of time, writing a timing mark extension to the second timing mark and writing a timing mark in a fourth circumferential position.

12. The method of claim 1, further comprising:

repeating the detecting of an extension of the first timing mark, waiting a specified period of time, writing a timing mark extension to a third timing mark and writing a timing mark in a fifth circumferential position.

13. The method of claim 1 further comprising:

a time interval between detection of a timing mark at a circumferential location with a read head and writing of a timing mark extension at the circumferential location with a write head is less than the timing mark duration.

14. The method of claim 13 wherein the write head precedes the read head such that detection of the timing mark at the circumferential location cannot occur before the write head is positioned to write a timing mark extension at the circumferential location on the recording media.

15. The method of claim 13 wherein the write head and the read head are at the same circumferential position relative to a timing mark such that detection of the timing mark cannot occur prior to the writing of the timing mark extension at the circumferential location.

16. A method for propagating a plurality of timing marks for servo data alignment on a storage medium, the method comprising:

detecting a passage of at least a portion of a first timing mark from a set of timing marks, wherein the first timing mark is located at a first radius and a first circumferential location;

waiting for a first delay period to expire and writing a second timing mark wherein the second timing mark is located at a second radius and a second circumferential location; and waiting for a second delay period to expire and writing a third timing mark, wherein the third timing mark is located at the second radius and a third circumferential location and wherein the third timing mark is not a radial extension of a previously written timing mark.

17. The method of claim 16, further comprising:

moving a read write head one step radially.

18. The method of claim 17, further comprising:

detecting an extension of the first timing mark, waiting a predefined period of time and writing a second timing mark extension and a third timing mark extensions to the second timing mark and the third timing mark.

19. The method of claim 18, further comprising:

repeating the detecting of the first timing mark, waiting a specified period of time and writing extensions to the second timing mark and third timing marks for a predetermined number of radial steps N1.

20. A system for propagating a plurality of timing marks for servo data alignment on a rotatable storage medium, comprising:

an organizational unit for arranging a plurality of timing marks into timing groups; and a writing unit for writing timing marks using timing marks as trigger timing marks; wherein the writing unit writes timing mark extensions.

21. The system of claim 20, wherein the writing unit writes two timing marks off each timing mark such that the two timing marks are at least twice as long as an ordinary timing mark.

22. The system of claim 20, wherein a timing mark group further comprises timing mark slots.

23. A system for propagating a plurality of timing marks for servo data alignment on a rotatable storage medium, comprising:

an organizational unit for arranging a plurality of timing marks into timing groups; and a writing unit for writing timing marks using timing marks as trigger timing marks wherein the writing unit does not write timing marks continuously through an entire radius of a rotatable storage medium.

* * * * *